United States Patent [19]

Sakakibara et al.

[11] Patent Number: 5,168,702
[45] Date of Patent: Dec. 8, 1992

[54] THIN TORQUE CONVERTER

[75] Inventors: Shiro Sakakibara, Anjo; Takashi Furuya, Chiryu; Naoki Tsuchiya, Anjo, all of Japan

[73] Assignee: Aisin AW Co., Ltd., Japan

[21] Appl. No.: 633,345

[22] Filed: Dec. 27, 1990

[30] Foreign Application Priority Data

Dec. 28, 1989 [JP] Japan .................. 1-343356

[51] Int. Cl.⁵ ............................................ F16D 33/00
[52] U.S. Cl. ............................................. 60/345; 60/361
[58] Field of Search ............... 60/361, 362, 364, 341, 60/342, 343, 344, 345, 346, 365, 366

[56] References Cited

U.S. PATENT DOCUMENTS

| | | | |
|---|---|---|---|
| 2,994,197 | 8/1961 | Mamo | 60/345 |
| 3,079,756 | 3/1963 | Farrell | 60/343 |
| 3,138,107 | 6/1964 | Zeidler | 60/361 |
| 3,152,447 | 10/1964 | Waclawek | 60/362 |
| 4,009,570 | 3/1977 | Ohkuoo et al. | 60/362 X |
| 4,186,557 | 2/1980 | Arai et al. | 60/361 |
| 4,783,960 | 11/1988 | Kubo et al. | 60/361 X |
| 4,953,353 | 9/1990 | Lederman | 60/345 |

FOREIGN PATENT DOCUMENTS

| | | | |
|---|---|---|---|
| 627308 | 9/1961 | Canada | 60/362 |
| 684385 | 12/1952 | United Kingdom | 60/345 |
| 830945 | 3/1960 | United Kingdom | 60/345 |

Primary Examiner—Edward K. Look
Assistant Examiner—John Ryznic
Attorney, Agent, or Firm—Lorusso & Loud

[57] ABSTRACT

There is disclosed a thin torque converter, fluid coupling device mounted on a vehicle. The converter which has a smaller axial dimension than the prior art converter, comprises an outer race, an inner race, a number of sprags mounted between the races, and two thrust washers. The races and the sprags are held between the washers. The sprags are wider than the inner surface of the outer race, but narrower than the outer surface of the outer race. The washers have radial outward portions bent along the side end surfaces of the outer race. Snap rings anchored to the boss of the stator of the converter prevent the washers from coming off.

3 Claims, 3 Drawing Sheets

THIN TORQUE CONVERTER

FIELD OF THE INVENTION

The present invention relates to a thin torque converter, that is, a fluid coupling having a short axial dimension and more particularly, to the structure of a one-way clutch that supports the stator of such a torque converter.

BACKGROUND OF THE INVENTION

A conventional thin torque converter a type of fluid coupling, is shown in FIG. 3. This converter, indicated by numeral 1', has a pump impeller 3 connected with an input member 2, a turbine runner 6 connected with an output member 5, and a stator 7 located in the oil path between the runner 6 and the impeller 3. The stator 7 is connected and held to a stationary member via a one-way clutch 9.

This one-way clutch 9 comprises an outer race 10, an inner race 11, sprags 12 forming wedge members located between the outer race 10 and the inner race 11, and two thrust washers 13, 14. The stator 7 has a boss 7a over which the outer race 10 is fitted. The inner race 11 is connected with the stationary member via a sleeve shaft. The washers 13 and 14 are held between thrust bearings 15 and 16 such that the outer race, the inner race, and the sprags are sandwiched between these washers.

The outer race 10 of this conventional construction has side end surfaces 10a' which are flat in the same way as the inner race 11. The thrust washers 13 and 14 extend straight radially outwardly along the flat end surfaces 10a' to form flat plate portions 13a and 14a, respectively. Snap rings 17 and 19 which are fitted over the boss 7a of the stator prevent the flat plate portions 13a and 14a from coming off.

When the one-way clutch 9 is free to rotate, the outer race 10 rotates relative to the inner race 11. In this state, the protruding portions 13b and 14b of the thrust washers 13 and 14 are fitted between the races 10 and 11 to prevent the sprags 12 from rolling over or popping out. At this time, the thrust washers 13 and 14 rotate with the outer race 10. These washers provide a large surface area in contact with the inner race 11. When the clutch is locked, the sprags 12 exert a large radially outwardly directed force and a large shearing force on the outer race 10. These forces are received by the flat end surfaces 10a' of the outer race 10. Hence, the clutch has sufficient durability.

Although the one-way clutch 9 described above performs desired functions and has desired durability, the width of the outer race 10, the thicknesses of the two thrust washers 13, 14, and the thicknesses of the snap rings 17 and 19 together form the axial dimension of the clutch. Thus, the axial dimension is increased. Also, the weight is relatively large. As a result, it is impossible to make the torque converter 1' thinner and lighter in weight.

SUMMARY OF THE INVENTION

It is an object of the invention to provide a torque converter which is equipped with a lightweight one-way clutch having a short axial dimension, whereby the converter is made thinner and lighter in weight and the accelerating ability and the fuel economy of the vehicle incorporating this converter are improved.

This object is achieved by a thin torque converter comprising: an input member; a pump impeller connected to the input member; an output member; a turbine runner connected with the output member; a stator having a boss and mounted in the oil passage extending from the turbine runner to the pump impeller; a one-way clutch by which the stator is connected to a stationary member, the clutch comprising an outer race fitted over the boss of the stator, an inner race connected to the stationary member, wedge members mounted between the outer and inner races, and thrust washers located in such a way that the outer race, the inner race, and the wedge members are held between the washers. The outer surface of the outer race is wider than the wedge members but narrower than the inner surface of the outer race. The thrust washers have radially outward portions bent along the side end surfaces of the outer race. Retaining members which are anchored to the boss of the stator prevent the thrust washers from coming off.

Rotation of the input member is transmitted to the pump impeller and then to the turbine runner via oil. The rotation is then transmitted to the input shaft of an automatic transmission. Oil from the torque converter is forced through the pump impeller, the turbine runner, the stator, and returned to the impeller. In this way, oil circulates through the converter. When the turbine runner and the pump impeller differ greatly in rotational speed, the stator deflects the flow of oil to increase the torque accordingly. That is, torque multiplication occurs. At this time, the clutch locks the stator. When the rotational speed of the turbine runner increases and approaches that of the impeller, oil from the runner acts on the back sides of the blades of the stator. The clutch permits the stator to revolve freely, and coupling occurs.

When torque multiplication takes places as described above, the outer race and the inner race of the one-way clutch are prevented from rotating relative to each other by the wedge members. At this time, the wedge members apply a large radially outwardly directed force and a large shearing force to the outer race. Since the outer race is wider than the wedge members, the outer race can sufficiently accept these forces. The wide inner surface of the outer race cooperates with the inner race to prevent the wedge members from rolling over or popping out.

When coupling occurs as described above, the one-way clutch is free to rotate, thus allowing the outer and inner races to rotate relative to each other. The thrust washers which rotate with the outer race make frictional contact with the inner race, and provide a large surface area in contact with the inner race. Hence, it is unlikely that these components wear down quickly.

Other objects and features of the invention will appear in the course of the description thereof which follows.

DETAILED DESCRIPTION OF THE INVENTION

Figure 1:
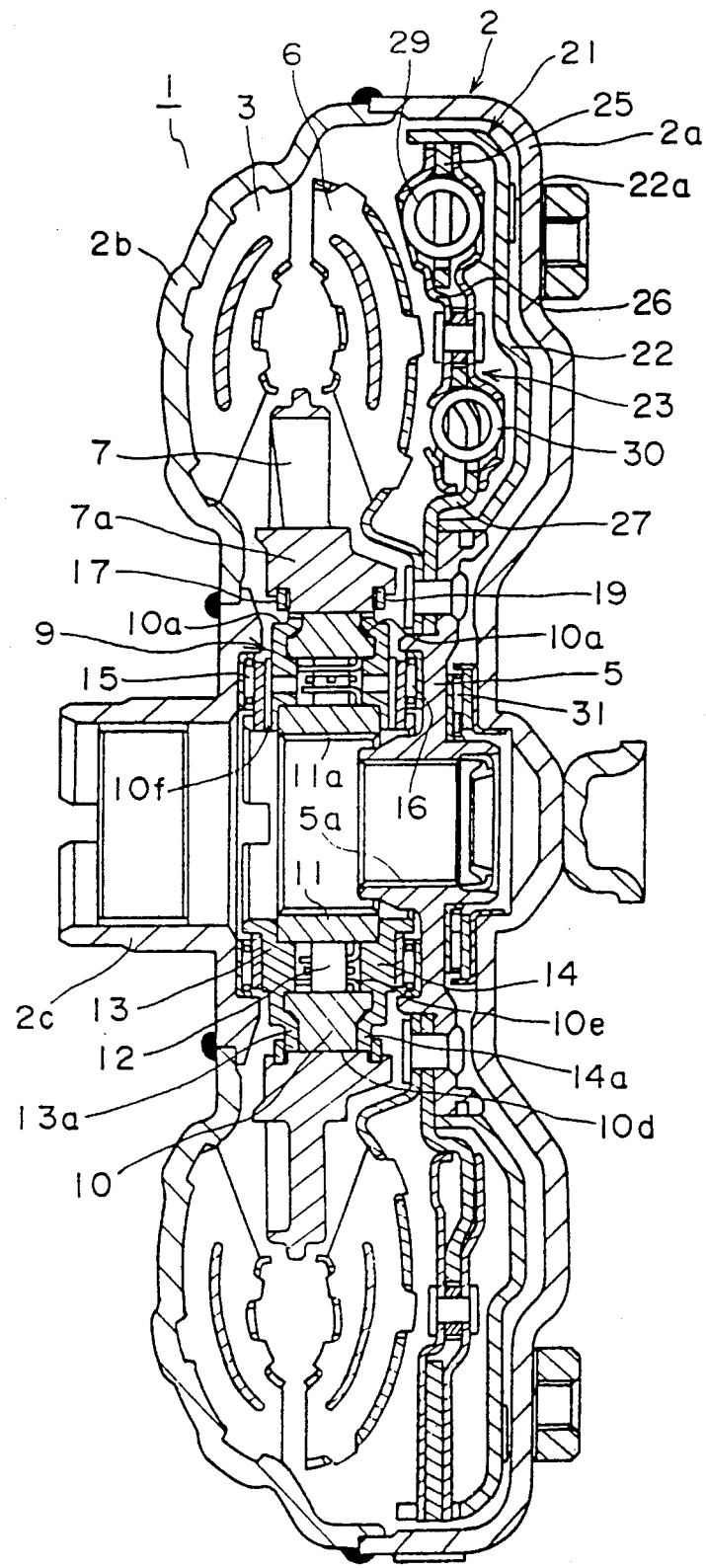
FIG. 1 is a cross-sectional view of a torque converter according to the invention.

Referring to FIG. 1, there is shown a flat and thin torque converter according to the invention. This converter, generally indicated by reference numeral 1, has a converter housing 2 consisting of a front cover 2a, a case 2b, and a boss 2c which are coupled together. This housing 2 is connected with the engine crankshaft (not shown) to form an input member. A number of blades are mounted to the case 2b to form a pump impeller 3. A turbine runner 6 consisting of a multiplicity of blades is located opposite to the impeller. A stator 7 which also consists of numerous blades is mounted between the impeller 3 and the turbine runner 6. The stator 7 is fitted in a one-way clutch 9.

The pump impeller 3, the turbine runner 6, and the stator 7 together form a torque converter unit. A direct-coupled clutch 21 is mounted inside the front cover 2a adjacent to the torque converter unit. The clutch 21 comprises a clutch plate 22 and a damper mechanism 23. A friction member 22a is stuck on the plate 22. The clutch plate 22 is rotatably held to a hub 5 which forms an output member. The clutch is engaged or disengaged by axial movement of the clutch plate, which is caused by changing the direction of flow of oil.

More specifically, when oil is forced toward the converter unit from between the plate 22 and the front cover 2a, the clutch plate 22 is moved away from the front cover 2a, so that the clutch is disengaged. When oil is forced out of the converter unit and flows between the plate 22 and the cover 2a, the friction member 22a of the clutch plate is brought into contact with the cover 2a, whereby the clutch is engaged. The damper mechanism 23 has a drive plate 25, an intermediate plate 26, a driven plate 27, an outer coil spring 29 mounted between the drive plate 25 and the intermediate plate 26, and an inner coil spring 30 mounted between the intermediate plate 26 and the driven plate 27. The driven plate 27 is fixedly mounted to the hub 5 by a riveted pin together with the boss of the turbine runner 6 of the torque converter unit. The hub 5 is placed in position between the front cover 2a and the clutch 9 by thrust bearings 16 and 31. The input shaft (not shown) of an automatic transmission is fitted in a spline 5a formed in the hub 5 to form the output member of the converter 1.

Figure 2:
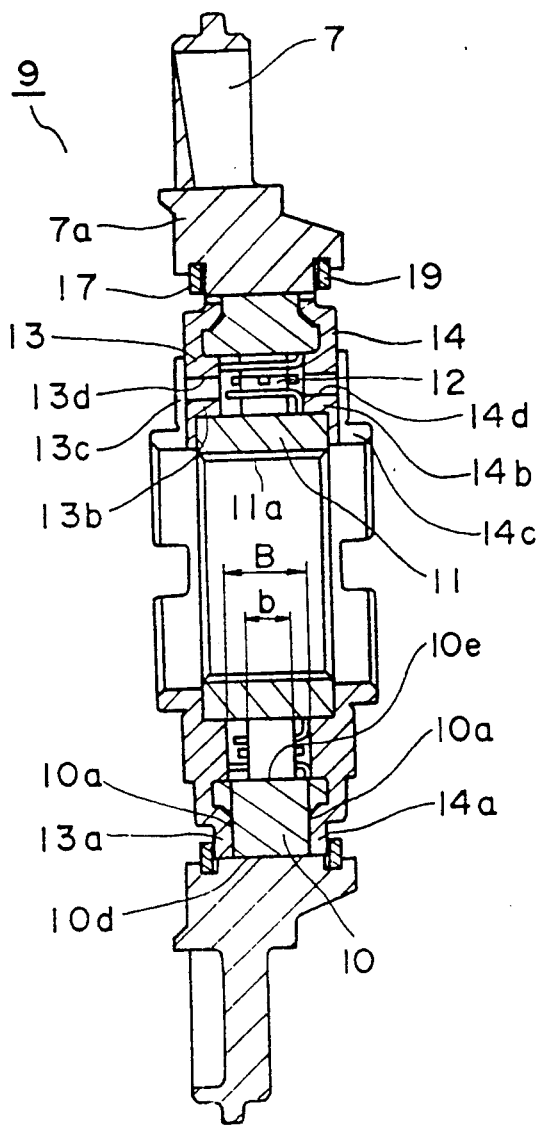
FIG. 2 is an enlarged cross section of the one-way clutch of the converter shown in FIG. 1.
Figure 3:
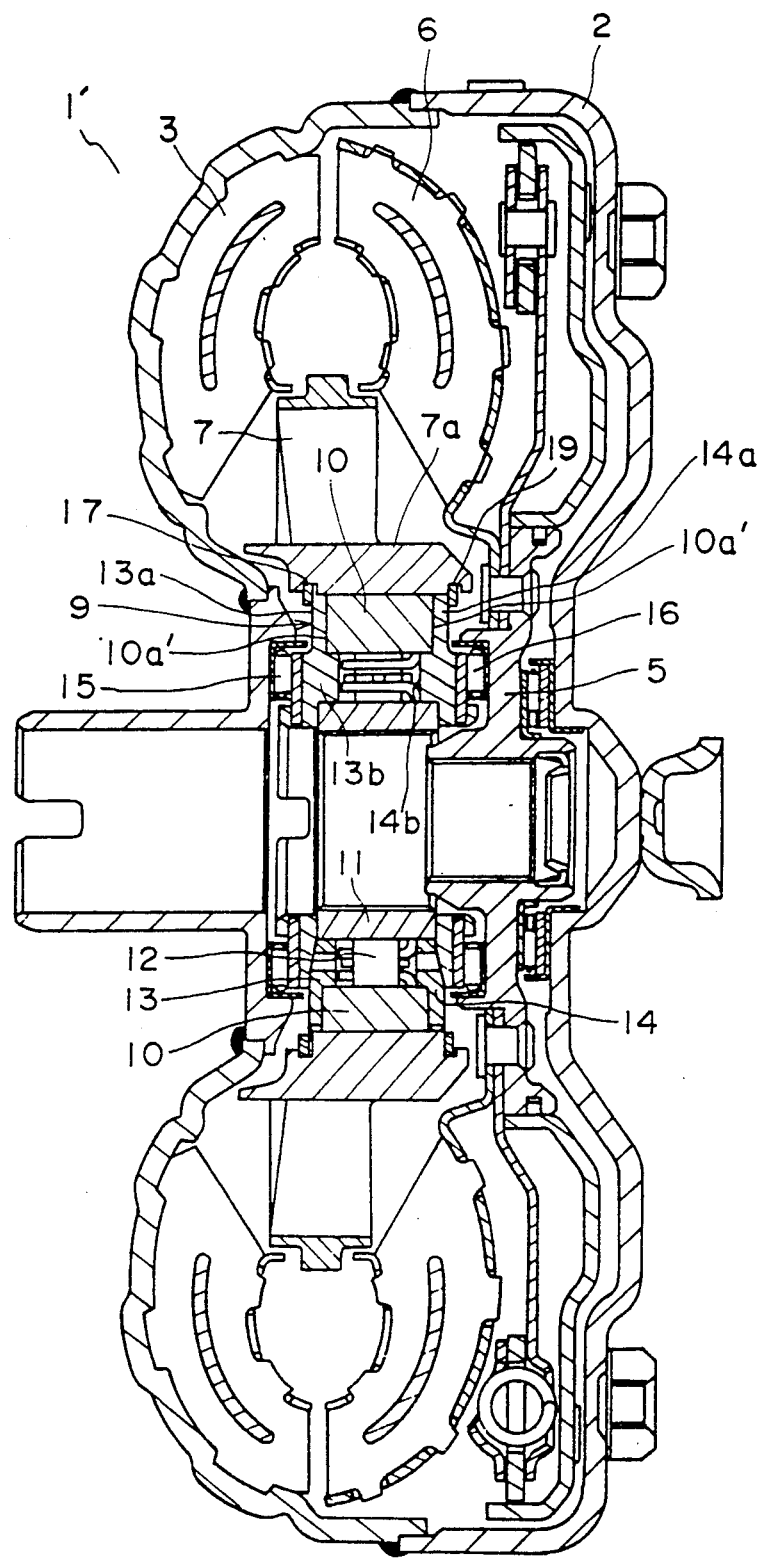
FIG. 3 is a cross-sectional view of a conventional torque converter.

As shown in FIGS. 1 and 2, the one-way clutch 9 comprises an outer race 10, an inner race 11, sprags 12, a left thrust washer 13, and a right thrust washer 14. The clutch 9 is held between the boss 2c of the housing and the hub 5 and placed in position by thrust bearings 15 and 16. The outer race 10 is fitted over the boss 7a of the stator 7 such that the race 10 is prevented from rotating by a protruding claw. The outer race 10 has cutout portions 10a around its side ends such that the outer surface 10d is narrower than the inner surface 10e. The narrowed width B of the outer surface 10d is rendered larger than the width b of the sprags 12. The radially outwardly directed force and the shearing force exerted by the sprags 12 are accepted within the width B of the outer surface 10d. The side end surfaces of the inner race 11 are flattened. A spline 11a is formed in the inner surface of the inner race 11 so that it may be connected with a stationary member such as the body of a pump via a sleeve shaft (not shown). The numerous sprags 12 are mounted between the outer race 10 and the inner race 11 and urged to rotate in a given direction. When the outer race 10 tries to rotate in a given direction, the sprags are tilted to permit the rotation of the outer race. When it tries to rotate in the opposite direction, the sprags act like wedges and hinder the rotation. The thrust washers 13 and 14 are located between the outer race 10 and the inner race 11 and surrounded by the sprags 12, the thrust bearings 15, 16. The washers 13 and 14 have annular protrusions 13b and 14b, respectively, which are fitted between the races 10 and 11. The outer portions of the protrusions 13b and 14b of the washers 13 and 14 are bent so as to extend along the cutouts 10a formed in the outer race 10. Radially extending grooves 13c and 14c are formed inside the side end surfaces and regularly angularly spaced from each other. Oil pits 13d and 14d extend axially through the washers 13 and 14, respectively. These grooves 13c, 14c, and the oil pits 13d, 14d allow oil to circulate through the torque converter and supply lubricating oil to the thrust washers 13 and 14 themselves and to the sprags 12. Two annular grooves that are relatively close to each other are formed in the boss 7a of the stator. Snap rings 17 and 19 are fitted in the grooves to prevent the bent outer portions 13a and 14a of the thrust washers from coming off.

The axial dimension of this one-way clutch 9 is shortened, corresponding to the cutouts formed in the outer portions 10a of the outer race 10. This permits the axial dimension of the boss 7a of the stator 7 to be reduced. These reductions in the dimensions of the one-way clutch 9 and the stator boss 7a are combined with the reductions in the widths of the pump impeller and the turbine runner 6 to achieve a great reduction in the thickness of the torque converter 1.

In the operation of the torque converter constructed as described above, torque produced by the engine is transmitted to the pump impeller 3 via the converter housing 2. The centrifugal pumping action of the impeller 3 causes the oil to circulate through the converter. Then, the torque is transmitted to the turbine runner 6 via the oil. Rotation of the runner 6 is transmitted to the hub 5 and then to the input shaft of the automatic transmission that is splined to the hub.

Oil sent from the pump impeller 3 to the turbine runner 6 is forced back to the impeller 3 via the stator 7. When the pump impeller and the turbine runner differ greatly in rotational speed, oil from the turbine runner 6 is directed to the impeller 3 by the stator 7 to augment the torque. The factor of augmentation is increased or decreased as the difference in rotational speed increases or decreases, respectively.

The torque acting on the stator 7 through the oil is accepted by the stationary member when the one-way clutch 9 locks up. In particular, the sprags 12 act like wedges to prevent the outer race 10 from rotating relative to the inner race 11 that is fixedly mounted to the stationary member. At this time, the sprags 12 apply large outwardly directed force and shearing force to the outer race 10. These forces are accepted within the width B of the outer surface 10d, that is wider than the width b of the sprags 12, so that the outer race 10 is prevented from deforming.

When the turbine runner 6 turns at high speeds, oil from the runner 6 hits the back sides of the blades of the stator 7. As a result, opposing torque acts on the stator 7. The one-way clutch 9 enables the stator 7 to rotate freely. At this time, the outer race 10 of the clutch 9 rotates relative to the inner race 11. The thrust washers 13 and 14 rotate with the outer race 10 while making sliding contact with the inner race 11. The washers 13 and 14 provide a relatively large surface area in contact with the inner race 11, so that the inner race 11 and the washers 13 and 14 are prevented from wearing down quickly and the accuracy of the concentricity is maintained over the long period of time. In addition, the sprags 12 are prevented from rolling over, popping out, or causing other undesirable phenomenon, because the sprags are located between the relatively wide outer surface of the inner race 11 and the inner surface of the outer race 10.

When power is being transmitted via the oil, if the oil supply passage then is switched to the other passage, the friction member 22a of the clutch plate 22 makes contact with the front cover 2a, i.e., the direct-coupled clutch 21 is engaged. In this state, torque from the engine is transmitted to the hub 5 via the front cover 2a, the clutch plate 22, and the damper mechanism 23 without use of the oil pathway. Impulsive torque produced by the connection of the plate 22 is first absorbed by the outer coil spring 29 mounted between the drive plate 25 and the intermediate plate 26. The remaining torque is absorbed by the inner coil spring 30 located between the intermediate plate 26 and the driven plate 27.

The novel one-way clutch 9 has strength and durability. As the outer surface 10d of the outer race 10 is to be narrower than the inner surface 10e, and because the thrust washers 13 and 14 bent along the side end surfaces 10a of the outer race 10 and are prevented from coming off by the retaining members 17 and 19, the axial dimension of the clutch 9 can be reduced. Additionally, the axial dimension of the boss 7a of the stator 7 can be reduced. Consequently, the axial dimension and the weight of the torque converter 1 can be reduced further. The torque converter and the automatic transmission integral with the converter, can be installed on a vehicle with greater ease. Furthermore, the accelerating ability and the fuel economy of the vehicle can be improved.

In the above example, the wedge members of the one-way clutch 9 are sprags. Of course, the wedge members are not limited to sprags. Rollers and other type of wedge members may be similarly used.

What is claimed is:

1. A thin torque converter comprising:
    an output member;
    a turbine runner connected to the output member;
    an input member;
    a pump impeller connected to the input member for creating a path of oil flow for driving said turbine runner;
    a one-way clutch comprising an outer race, an inner race, wedge members mounted between the outer race and the inner race, and thrust washers located in such a way that the outer race, the inner race, and the wedge members are held between the washers, said outer race having outer and inner surfaces connected by contoured, radially extending side end faces, said outer surface of said outer race being wider than said wedge members and narrower than said inner surface of said outer, race said thrust washers having radial extensions bent to mate with said contoured side end faces;
    a stator having a boss mounted on said one-way clutch, said boss having an inner cylindrical surface fitted over said outer race, said inner cylindrical surface having radially spaced recesses, and said stator being located in the oil path between the turbine runner and the pump impeller; and
    retaining members mounted in said recesses in said inner cylindrical surface of said boss and extending radially along said radial extensions to confine said radial extensions therebetween to prevent the thrust washers from coming off.

2. The thin torque converter of claim 1, wherein said wedge members are sprags.

3. The thin torque converter of claim 1, wherein said wedge members are rollers.

* * * * *

UNITED STATES PATENT AND TRADEMARK OFFICE
CERTIFICATE OF CORRECTION

PATENT NO. : 5,168,702

DATED : December 8, 1992

INVENTOR(S) : SAKAKIBARA et al.

It is certified that error appears in the above-identified patent and that said Letters Patent is hereby corrected as shown below:

Col. 1, line 12, after "converter" insert a comma --,--.

Col. 5, line 5, delete "the", second instance, and insert --this--;

line 6, delete "the", first instance, and insert --a--;

line 13, before "the", second instance, insert --then--;

line 26, after "is" insert --made--;

line 28, after "14" insert --are--; and line 29, after "10" insert a comma --,--.

UNITED STATES PATENT AND TRADEMARK OFFICE
CERTIFICATE OF CORRECTION

PATENT NO. : 5,168,702

DATED : December 8, 1992

INVENTOR(S) : Sakakibara et al

It is certified that error appears in the above-identified patent and that said Letters Patent is hereby corrected as shown below:

Col. 6, line 22, delete "outer, race" and insert --outer race,--.

Signed and Sealed this

Seventh Day of December, 1993

Attest:

BRUCE LEHMAN

*Attesting Officer*   *Commissioner of Patents and Trademarks*